(12) United States Patent
Ptak et al.

(10) Patent No.: US 8,105,425 B2
(45) Date of Patent: *Jan. 31, 2012

(54) AIR FILTER FORMED BY SLIT AND EXPANDED LAYERS OF ELECTROSTATICALLY ENHANCED MATERIAL

(75) Inventors: Thaddeus J. Ptak, Canal Winchester, OH (US); Chrystal B. Gillilan, Ashville, OH (US); Russell Baldinger, Laurelville, OH (US)

(73) Assignee: Columbus Industries, Inc., Ashville, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/078,310

(22) Filed: Apr. 1, 2011

(65) Prior Publication Data

US 2011/0174157 A1   Jul. 21, 2011

Related U.S. Application Data

(62) Division of application No. 11/853,513, filed on Sep. 11, 2007, now Pat. No. 7,951,229.

(51) Int. Cl.
*B03C 3/28* (2006.01)
(52) U.S. Cl. .......... 96/17; 55/497; 55/521; 55/525; 55/DIG. 5; 55/DIG. 39; 96/67; 264/479; 264/484; 264/DIG. 48
(58) Field of Classification Search ........ 96/17, 67, 96/69; 55/486–489, 497, 521, 525, DIG. 5, 55/DIG. 39; 264/154, 285, 286, 479, 484, 264/DIG. 48
See application file for complete search history.

(56) References Cited

U.S. PATENT DOCUMENTS

| | | | | | |
|---|---|---|---|---|---|
| 2,037,164 | A | * | 4/1936 | Harrah | 55/489 |
| 2,070,073 | A | * | 2/1937 | Walton | 55/524 |
| 2,493,726 | A | * | 1/1950 | O'Day | 55/443 |
| 2,602,521 | A | * | 7/1952 | Smith | 55/487 |
| 2,847,086 | A | * | 8/1958 | Muller | 55/489 |
| 2,989,145 | A | | 6/1961 | Goodloe | |
| 3,177,637 | A | | 4/1965 | Davis | |
| 3,234,717 | A | | 2/1966 | Korn | |
| 3,280,542 | A | * | 10/1966 | Heijnis | 55/485 |
| 3,449,093 | A | * | 6/1969 | Baxt et al. | 307/400 |
| 3,500,618 | A | | 3/1970 | Sokol | |
| 3,659,402 | A | * | 5/1972 | Alliger | 96/297 |
| 3,806,390 | A | | 4/1974 | Balk et al. | |

(Continued)

FOREIGN PATENT DOCUMENTS

JP          61-209061 A   *  9/1986    ............ 96/67

(Continued)

*Primary Examiner* — Richard L Chiesa
(74) *Attorney, Agent, or Firm* — Jason H. Foster; Kremblas & Foster

(57) ABSTRACT

An air filter including a plurality of air-pervious sheets of electret filtration material. The sheets are disposed in a parallel relationship to form a stack of sheets, and each of the sheets has a plurality of slits formed therein for subsequent expanding to form openings. The stack is connected together at opposing ends, such as by bonding. The sheets can be pleated by mounting in a frame. The frame has opposing ends to which the opposing ends of the stack are mounted. The filter media initially has no frame and is not pleated, but is in a flat pad form that is expanded to be installed into a frame. The frame is then mounted in an appliance, such as a room air filter. When the filter is inserted into the filter housing it is expanded and can take a pleated form.

4 Claims, 3 Drawing Sheets

U.S. PATENT DOCUMENTS

| | | | |
|---|---|---|---|
| 3,880,626 A * | 4/1975 | Griwatz et al. | 55/485 |
| 4,323,374 A * | 4/1982 | Shinagawa et al. | 96/58 |
| 4,978,372 A * | 12/1990 | Pick | 96/67 |
| 5,443,606 A * | 8/1995 | Hassenboehler et al. | 55/486 |
| 5,492,551 A * | 2/1996 | Wolfe | 55/496 |
| 5,989,303 A * | 11/1999 | Hodge | 55/486 |
| 6,375,905 B1 | 4/2002 | Moini et al. | |
| 6,471,746 B2 * | 10/2002 | Hagglund et al. | 95/78 |
| 6,524,360 B2 * | 2/2003 | Cox et al. | 55/382 |
| 7,951,229 B2 * | 5/2011 | Ptak et al. | 96/17 |
| 2002/0108359 A1 | 8/2002 | Powell | |
| 2002/0170435 A1 | 11/2002 | Joannou | |
| 2004/0088958 A1 | 5/2004 | Richerson | |
| 2004/0163370 A1 | 8/2004 | Haufe et al. | |
| 2004/0182055 A1 | 9/2004 | Wynn | |
| 2005/0138906 A1 | 6/2005 | Kubokawa et al. | |
| 2005/0204714 A1 | 9/2005 | Sundet et al. | |
| 2006/0000196 A1 | 1/2006 | Beier et al. | |
| 2006/0243138 A1 * | 11/2006 | Spartz et al. | 96/69 |
| 2009/0064862 A1 * | 3/2009 | Ptak et al. | 96/55 |

FOREIGN PATENT DOCUMENTS

| | | |
|---|---|---|
| JP | 2002267327 | 9/2002 |

* cited by examiner

AIR FILTER FORMED BY SLIT AND EXPANDED LAYERS OF ELECTROSTATICALLY ENHANCED MATERIAL

CROSS-REFERENCES TO RELATED APPLICATIONS

This application is a divisional of U.S. application Ser. No. 11/853,513 filed Sep. 11, 2007, now U.S. Pat. No. 7,951,229, which application is incorporated herein by reference.

STATEMENT REGARDING FEDERALLY-SPONSORED RESEARCH AND DEVELOPMENT (Not Applicable)

REFERENCE TO AN APPENDIX (Not Applicable)

BACKGROUND OF THE INVENTION

1. Field of the Invention

This invention relates generally to filters for removing particles from air flowing through the filter.

2. Description of the Related Art

Conventional air filters utilize pleated or flat sheet filter media that filters the air by forcing the air through extremely small pores formed between fibers in the sheet media. By thus "straining" particles from the air, the air is cleaned and the filter retains the particles. Such filters have a substantial pressure drop across the filter, and a powerful motor is required to force the air through the filter. Furthermore, pressure drop increases as particles are filtered, because the filtered particles prevent air from flowing through the openings in the filter.

Some air filters are pleated to increase the amount of surface area available for particles to be collected in to reduce the increase in pressure drop. Pleating extends the surface so it becomes permeable at an acceptable pressure drop. However, this merely postpones the inevitable clogging of the filter with particles. Pleated material is generally sealed to a filter frame with hot melt, polyurethane or cold glue, and the processing and material costs with such filters are substantial. Sealing is necessary because any large openings in or around the filter tend to allow a disproportionate amount of air to pass through, thereby defeating the filter media's ability to strain particles.

Some air filters are manufactured with filter media that is electrostatically charged in order to attract particles in the air to the media. For such filters the main transport mechanism of particles to the media fibers is through collision, diffusion and electrostatic attraction rather than by forcing air through a pore that is smaller than the particle. However, such materials have substantial pressure drops, and are costly and are relatively incapable of being adapted to various applications.

The need exists for a low cost air filter that is capable of being adapted to various circumstances.

BRIEF SUMMARY OF THE INVENTION

An air filter made in accordance with the present invention includes a plurality of air-pervious sheets of electret filtration material. The sheets are disposed in a parallel relationship to form a stack of sheets, and each of the sheets has a plurality of slits formed therein for subsequent expanding for opening the slits to form openings. The stack is connected together at opposing ends. In a preferred embodiment, the sheets are pleated by mounting in a frame. The frame has opposing ends to which the opposing ends of the stack are mounted.

The present invention includes a broad range of filter performance, which depends on the number of layers, the type of media, the use of other layers in combination with the electret layers, and the degree of expansion. The filter media initially has no frame and is not pleated. Instead, it is in a flat pad form that is expanded to be installed into a frame, which is then mounted in an appliance, such as a portable air cleaner. When the filter is inserted into the filter housing it is expanded and preferably takes a pleated form.

The pressure drop across the filter is low, and the filter is designed for use where high efficiency for collecting submicron particles is not required. Upon exhaustion of the filter media stack, the operator of the appliance can install a replacement filter stack. The frame can be reused, and only the filter media stack is replaced.

The filter media stack is preferably formed in a flat form that can be sold to a customer, who fits the stack onto the frame that expands the slit media and further places it in a generally pleated configuration without the need for hot melt or other means to form the pleats or seal the filter frame. Air flowing through the filter media layers takes a tortuous path, which results in comparable efficiency to a conventional pleated air filter at lower costs and without the design limitations.

The cost of manufacture and shipping of the slit filter media strip provides many advantages for a low cost filter having good efficiencies at low pressure drops because of the electrostatic nature of the primary filter material. Slitting and expanding gives excellent efficiency by increasing the surface area and creating tortuous paths so that there are many collisions and attractions by electrostatic charge.

The filter media is preferably a randomly oriented fibrous material that is electrostatically charged. The person having ordinary skill will recognize that there are many such materials that would substitute for the materials named herein.

Figure 1:
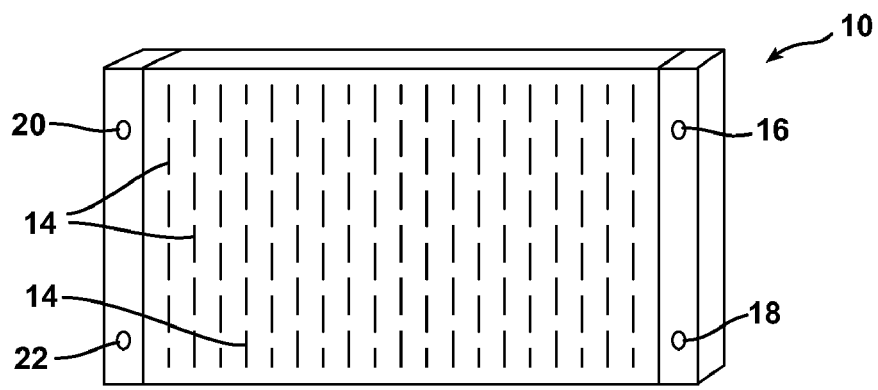
FIG. 1 is a view in perspective illustrating a preferred embodiment of the present invention.

In describing the preferred embodiment of the invention that is illustrated in the drawings, specific terminology will be resorted to for the sake of clarity. However, it is not intended that the invention be limited to the specific term so selected and it is to be understood that each specific term includes all technical equivalents that operate in a similar manner to accomplish a similar purpose. For example, the word connected or terms similar thereto are often used. They are not limited to direct connection, but include connection through other elements where such connection is recognized as being equivalent by those skilled in the art.

DETAILED DESCRIPTION OF THE INVENTION

Figure 2:
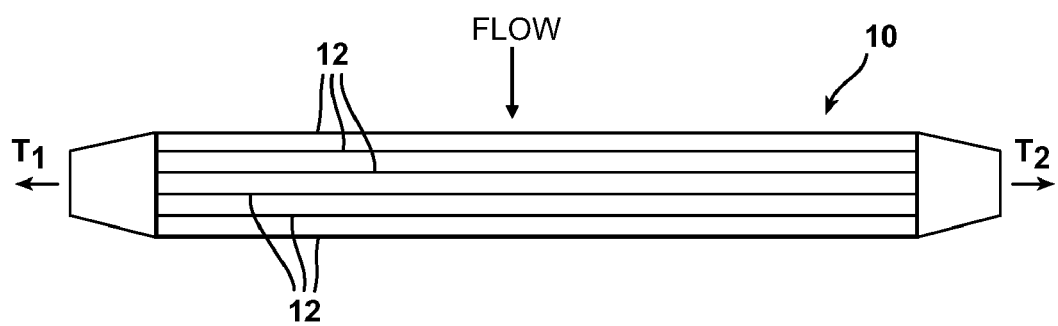
FIG. 2 is a side view illustrating the embodiment of FIG. 1 viewed along the planes of the filter media layers.

A particulate air filter 10 is illustrated in FIGS. 1 and 2 made of multiple layers 12 of slit, electret (electrostatically charged) filter media sheets that are air pervious. Air pervious is defined herein as any material that has a permeability greater than about 1 cubic feet per minute per square foot (cfm/ft$^2$) at a pressure drop of 0.5 inches w·g. One device used to measure pressure drop is the Frazier differential pressure air permeability instrument. A preferred range will include 20 to 500 cfm/ft$^2$, and another range is 50 to 200 cfm/ft$^2$. Even more restrictive media can be used, but the media used in the present invention preferably has a permeability of at least about 20 cfm/ft$^2$ and a typical range is about 20 to about 30 cfm/ft$^2$.

Each layer 12 is a flexible, preferably planar sheet of filtration material formed by bonding a plurality of fibers together in a conventional manner, and in which an electrostatic charge remains due to conventional electret filter media principles. The layers 12 of charged filter media are stacked together in a parallel configuration in the manner of a deck of playing cards as shown in FIG. 2.

There are several electret, air-pervious layers 12 in the filter 10. The preferred number is between about four and about ten layers per filter 10. An exemplary number of layers 12 is six. The number of layers 12, however, can range between about two and about twenty, depending upon the application. As noted below, other non-electret layers can be placed adjacent to the electret layers to obtain the advantages that will become apparent from the description herein.

The opposing ends of the filter 10 are preferably bonded together, for example, thermally, ultrasonically or with adhesive or stitching, to make the filter 10 easy to handle and install in the appliance that forces air through the filter 10, as described more fully below. The filter 10 has no frame in its initial, pre-expanded state shown in FIGS. 1 and 2 in which the filter 10 retains a substantially planar form.

Each layer 12 is slit in a conventional manner with a predetermined knife size to create slits 14 shown in FIG. 1 that open when the filter is expanded as described below. The slits are transverse to the direction of force applied to expand the layers 12, and preferably substantially perpendicular thereto as shown in FIG. 1. The slits within each layer can be oriented at various, different angles to the direction of the tensile force applied. The slits within layers of media are perpendicular to the direction of force, which direction is controlled by the manufacturing process. Alternatively, the slits within a layer can be formed at the same angle to the direction of the force, and different layers can have slits that form different angles to the force. A combination of these is also contemplated.

The slits within a particular layer are preferably the same size. Alternatively, the slits can vary in size within a particular layer. In an alternative embodiment, the slits in a particular layer are the same size, but the slit sizes vary from layer to layer. A combination of these is also contemplated. A combination of slit size and orientation is also contemplated.

The slits in each layer 12 are formed along parallel lines as shown in FIG. 1 so that when tensile forces $T_1$ and $T_2$ (see FIG. 2) are applied to opposing ends of the filter 10 and perpendicular to the parallel lines of the slits, the material of the layers 12 between the slits stretches, and the slits open to form passages through each layer 12. It is preferred that the slits 14 in a particular layer are not positioned directly over the slits of an adjacent layer. Thus, when the filter 10 is expanded, the openings formed therein form tortuous paths through the filter 10. It is contemplated that the tensile forces $T_1$ and $T_2$ necessary to expand the filter 10 are easily applied by hand by the average person, so that the filter 10 can be expanded easily by virtually any person who is responsible to replace used air filters.

Expansion of the slits 14 preferably occurs before or during installation of the filter 10 in a frame. For example, after the application of the tensile forces $T_1$ and $T_2$ sufficient to expand the slits of the filter 10 to form openings, conventional pins (not shown) that are part of a filter frame or an apparatus that retains the filter 10 are extended through the apertures 16, 18, 20 and 22 formed through the bonded ends of the filter 10. The pins retain the filter 10 in an expanded form while the conventional appliance (not shown) forces air through the filter 10.

It is contemplated that the apparatus in which the invention is installed is a conventional appliance, such as a portable air cleaner or a heating, ventilation and air conditioning (HVAC) device. The filter 10 is preferably installed in a frame incorporated into the appliance body or door so that the flow of air is in the direction of the arrow denoted "FLOW" in FIG. 2. This flow path is transverse, and preferably substantially perpendicular, to the planes of the layers 12. A tight seal is not required at the edges of the filter 10 due to the intended purpose of the filter 10, which is low efficiency in collecting submicron particles in the stream of air.

When air is forced through the expanded filter 10, it must pass through open slits 14 in each layer 12. The openings in each layer 12 are preferably staggered relative to each adjacent layer's openings; that is, the openings are preferably not aligned with one another. This configuration forms tortuous paths through the stack of layers 12 which the air flows through under a pressure differential. Due to the flow of air through tortuous paths, the particles in the air collide with the sidewalls of the paths, which are formed by the surfaces of the layers 12, and such collisions provide opportunities for the particles to bond to the layer 12 under the influence of the layer's electrostatic charge.

Figure 3:
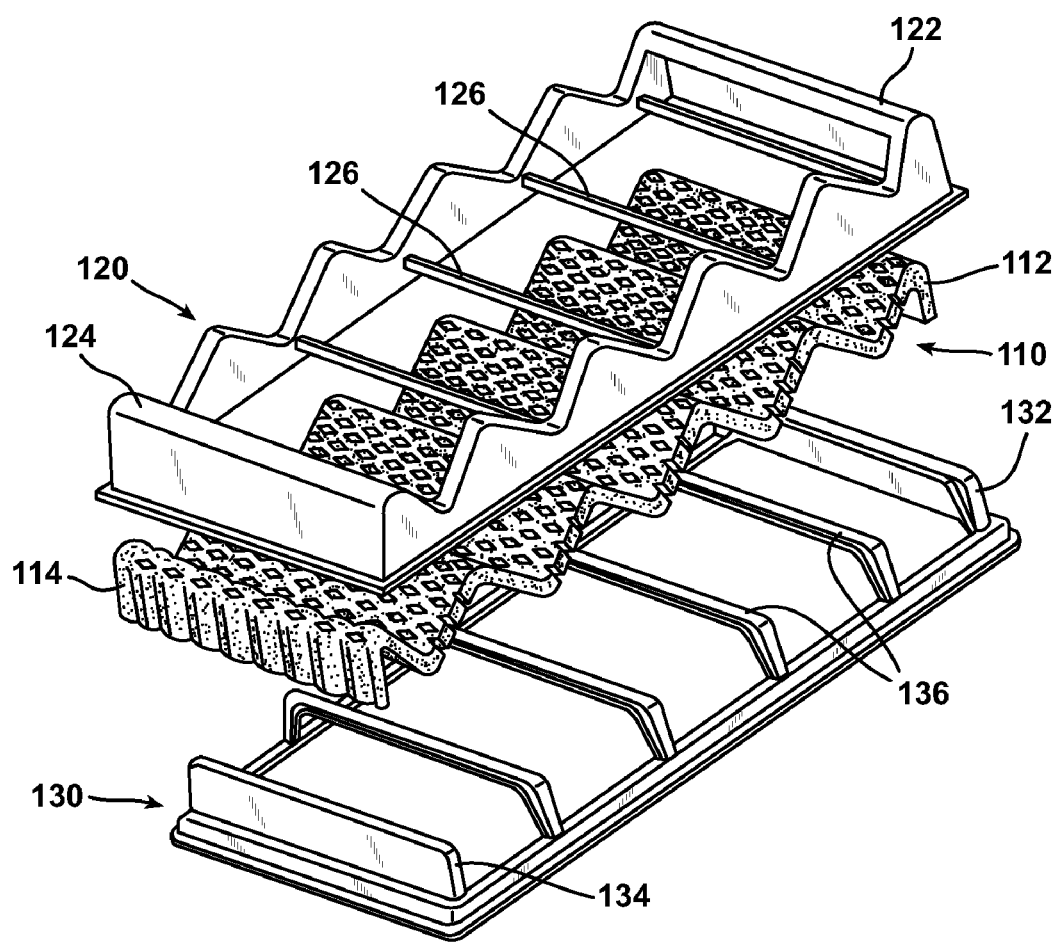
FIG. 3 is an exploded view in perspective illustrating an embodiment of the present invention.

In a preferred embodiment shown in FIG. 3, the filter 110 is made up of layers of slit and charged material. The filter 110 is shown in an expanded state, such as after applying a tensile force to the ends 112 and 114, and then is installed in the specifically designed filter frame that is made of an upper component 120 and a lower component 130 (in the orientation of FIG. 3). The filter 110 is shown in the exploded view of FIG. 3 in the "pleated" form that it will take after the frame components 120 and 130 are mounted on opposing sides of the filter 110. Notwithstanding the illustration, the filter 110 would not be pleated apart from the frame, because a tensile force is required to expand the slits, and this tensile force tends to retain the filter 110 in a planar shape.

The frame component 130 has ends 132 and 134 that insert in the pockets formed in voids beneath the corresponding ends 122 and 124 of the frame component 120. A gap that is slightly smaller than the thickness of the filter 110 is formed between each end of the frame component 130 and each end of the frame component 120 in which the ends 112 and 114 of the filter 110 are interposed in the manner of a clamp. The components 120 and 130 also have ribs 126 and 136, respectively, that extend across the openings in the components 120 and 130. The ribs 136 extend through the openings in the component 120 to push first portions of the filter 110 through the openings in the component 120. The ribs 126 restrain second portions of the filter 110 to prevent the second portions from being pushed as far as the ribs 136 push the first portions. This cooperation between the components 120 and 130 imparts a pleated configuration to the filter 110.

Thus, because the ends 112 and 114 of the filter 110 are clamped by the frame, while the ribs 126 and 136 force regions of the filter 110 in the above-described direction, the ends of the filter 110 are held in the position to which they are displaced during expansion, and the rest of the filter 110 is deformed further to a pleated configuration, as represented by the curvature shown in FIG. 3. The ribs 124 and 134 are staggered relative to one another, thereby forming the peaks (at the ribs 134) and valleys (at the ribs 124) of the pleated filter 110. This causes spreading out of the filter 110 to create open area allowing air to flow through.

The filter 110 is, therefore, initially formed as a planar pad with many layers, possibly including filter layers having different properties and a rigid backing layer that provides little to no filtration. All of these layers are expanded, and possibly also pleated, with the pleat controlled in size by the frame into which the filter is inserted. The pleated filter is mounted in a frame and the frame is mounted in an appliance.

The filtration layers in the invention are preferably made of randomly bonded fibers that form an air pervious sheet layer. Filter materials used to construct the filter must also be electrets. Examples of such materials include, but are not limited to, meltblown fibers such as polypropylene, polyester and nylon and their equivalents. This also includes meltblown fibers on a carrier material such as synthetic spunbond or air-laid material, wet-laid materials such as cellulose, synthetic or fiberglass. Other types of electrostatically charged media that can be used for the electret layers include triboelectric materials with and without the above-mentioned carriers and electrostatically enhanced material made of polypropylene fiber using spunbond technology.

It is also contemplated that a layer of charged fibers on one or both sides of one of the above carriers can be used with the above electret layers, as well as a layer of a carrier material with a tackifier to reduce large particle bouncing. Still further, a layer of a carrier material with adsorbents such as activated carbon, zeolite or baking soda can be used in combination with the above-mentioned electret layers. It is also contemplated that aluminum separators can be spaced between the layers, and expanded metal or plastic/metal combinations can be formed between the electret layers to form a mechanical support layer.

The preferred embodiment includes layers with different opening size combined in the filter, for example with an outer layer or layers of the filter with larger openings or more closely spaced openings than the inner layers, in order to create a gradient density type of filter as air progresses through the media. Other layers, in particular the inner layers, can be impregnated with activated carbon or zeolite for odor absorption.

As an experiment to test the effectiveness of the invention, several different electrostatically enhanced filter materials were slit and expanded. Filters were constructed using different numbers of layers, as well as different layer configurations. A plurality of combs expanded the filters to create a relatively open structure due to the slits formed in the filter layers. Layers of specific configurations, as noted in FIG. 4, were placed into the test fixture with open area of 9.95×9.75 inches and 5 combs that created pleats. One filter (material 2) was tested with and without ionization electrodes in order to demonstrate the effect on efficiency of electrostatically charging a filter material. The ionization electrode was placed approximately 15 inches above the test fixture, and was connected to a voltage of V=−8 kV. At least one of the filter layers was grounded.

Figure 4:
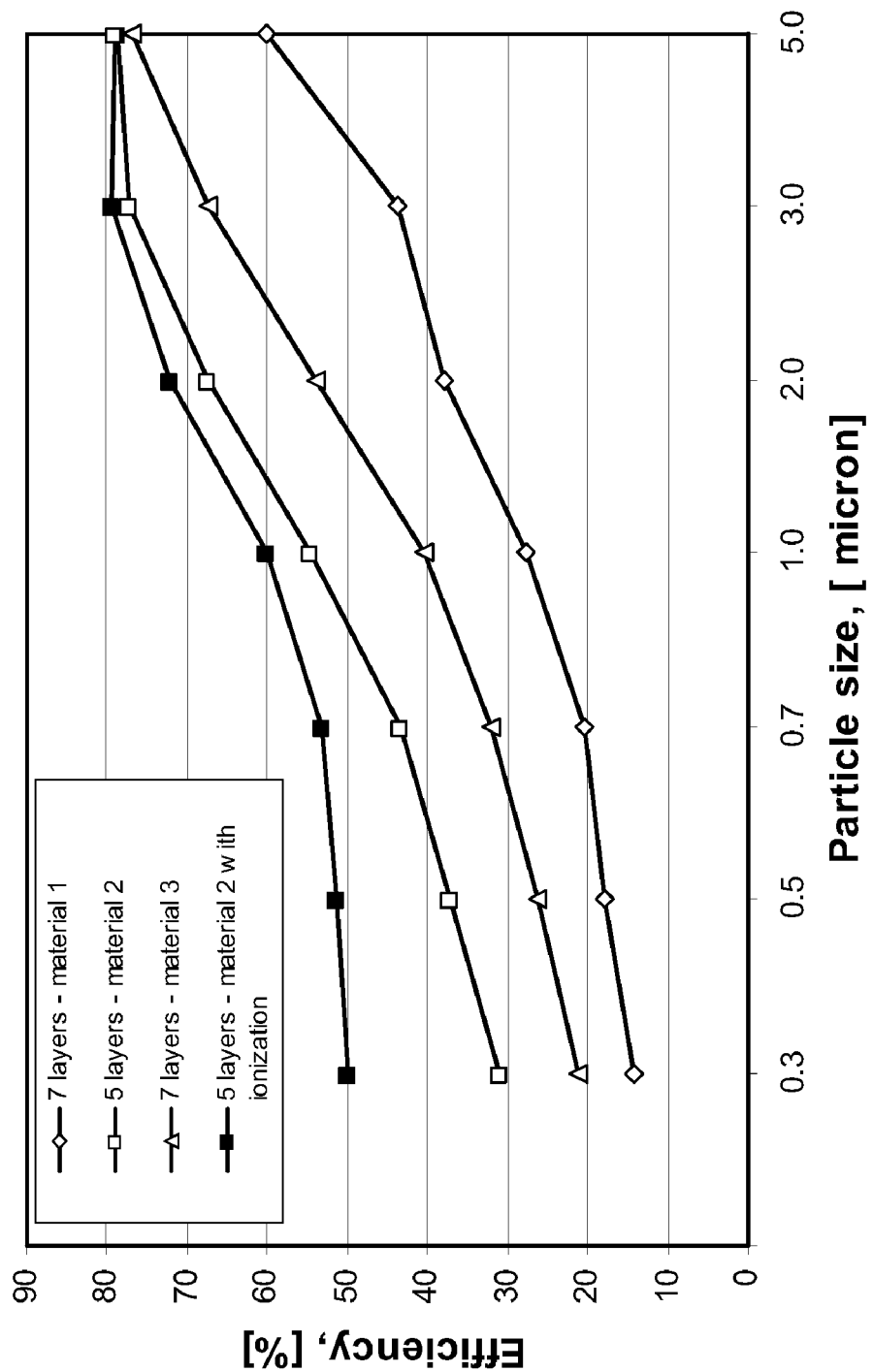
FIG. 4 is a graphical representation showing the results of experiments.

FIG. 4 shows the results of the experiment in which the filtration efficiency was measured at a flow rate of 57 cfm (cubic feet per minute) using KCl particles as a challenge aerosol. The experimental results show that there is a significant improvement in filtration efficiency for small particles (e.g., 0.3 and 0.5 micron) when ionization was utilized since electrostatic charges play a dominant role in particle collection.

The invention thus provides an effective and efficient filter made of air pervious material in layers that carries an electrostatic charge. When combined with other materials that are all slit and then eventually expanded, mechanical strength can be imparted to the entire filter. For example, one layer can be mechanically weak and collect particles well, and a backing layer may perform little to no collection, but be mechanically strong to maintain the shape of the filter media. By using multiple layers, the filter is "flexible", inasmuch as it can be modified to the requirements of the application of interest.

This detailed description in connection with the drawings is intended principally as a description of the presently preferred embodiments of the invention, and is not intended to represent the only form in which the present invention may be constructed or utilized. The description sets forth the designs, functions, means, and methods of implementing the invention in connection with the illustrated embodiments. It is to be understood, however, that the same or equivalent functions and features may be accomplished by different embodiments that are also intended to be encompassed within the spirit and scope of the invention and that various modifications may be adopted without departing from the invention or scope of the following claims.

The invention claimed is:

1. A method of forming an air filter, the method comprising:
   (a) forming slits in each of a plurality of air-pervious sheets of electret filtration material;
   (b) disposing the sheets in a parallel relationship to form a stack of sheets;
   (c) connecting opposing ends of the stack together;
   (d) applying opposing tensile forces to the opposing ends of the stack, thereby expanding the stack and opening at least some of said slits;
   (e) mounting the expanded stack in a housing; and
   (f) forcing air through the stack along a path transverse to a plane of the stack.

2. The method in accordance with claim 1, further comprising pleating the stack.

3. The method in accordance with claim 1, further comprising placing the stack in a removable frame with the frame attached to the stack near the first and second opposing ends.

4. An air filter comprising:
   a. a plurality of pleated, air-pervious sheets of electret filtration material disposed in a parallel relationship to form a stack of sheets, each of the sheets having a plurality of expanded slits formed therein, the stack being connected together at first and second opposing ends of the stack and mounted within a removable frame, wherein the frame attaches near the first and second opposing ends of the stack; and
   b. a non-electret sheet disposed in a parallel relationship with the stack of sheets, the non-electret sheet having a plurality of slits formed therein.

* * * * *